United States Patent
Marchionda et al.

(10) Patent No.: US 6,964,024 B2
(45) Date of Patent: Nov. 8, 2005

(54) OPERATOR-DEFINED VISITATION SEQUENCE OF CLIENT USER INTERFACE CONTROLS

(75) Inventors: Dawn M. Marchionda, Marion, NY (US); Joseph E. Miska, Rochester, NY (US); Jeremy E. Kriegel, Somerville, MA (US)

(73) Assignee: Xerox Corporation, Rochester, NY (US)

( * ) Notice: Subject to any disclaimer, the term of this patent is extended or adjusted under 35 U.S.C. 154(b) by 503 days.

(21) Appl. No.: 09/778,409

(22) Filed: Feb. 7, 2001

(65) Prior Publication Data

US 2002/0105547 A1 Aug. 8, 2002

(51) Int. Cl.⁷ .............................................. G06F 15/00
(52) U.S. Cl. ...................................... 715/811; 715/763
(58) Field of Search ...................... 715/811–812, 814, 715/817–820, 825–826, 840–841, 852, 762–763, 837, 744–747, 741–743, 802–805, 734–737, 853–854, 829, 839; 250/363, 367; 345/853–855, 744–747, 762–763, 730, 731, 732, 856–859, 821–823; 700/10–15, 20; 712/1, 3, 4

(56) References Cited

U.S. PATENT DOCUMENTS

| | | | | | |
|---|---|---|---|---|---|
| 5,570,108 A | * | 10/1996 | McLaughlin | ................ | 345/771 |
| 5,699,089 A | * | 12/1997 | Murray | ....................... | 345/823 |
| 5,790,119 A | * | 8/1998 | Sklut et al. | ................. | 345/839 |
| 5,794,001 A | * | 8/1998 | Malone et al. | ............. | 715/762 |
| 5,815,717 A | * | 9/1998 | Stack | ......................... | 717/105 |
| 5,943,039 A | * | 8/1999 | Anderson et al. | ........... | 345/810 |
| 5,950,002 A | * | 9/1999 | Hoford et al. | ................ | 717/109 |
| 5,953,007 A | * | 9/1999 | Center et al. | ............... | 345/772 |
| 6,025,827 A | * | 2/2000 | Bullock et al. | .......... | 715/500.1 |
| 6,054,988 A | * | 4/2000 | Alimpich et al. | ........... | 345/771 |
| 6,373,507 B1 | * | 4/2002 | Camara et al. | ............. | 345/825 |
| 6,433,341 B1 | * | 8/2002 | Shoji | ..................... | 250/370.09 |
| 6,456,304 B1 | * | 9/2002 | Angiulo et al. | ............. | 345/779 |
| 6,504,556 B1 | * | 1/2003 | Myers | ......................... | 345/839 |
| 6,583,798 B1 | * | 6/2003 | Hoek et al. | ................. | 345/822 |
| 6,613,101 B2 | * | 9/2003 | Mander et al. | ............. | 715/526 |
| 6,661,437 B1 | * | 12/2003 | Miller et al. | ................ | 345/810 |
| 6,745,193 B1 | * | 6/2004 | Horvitz et al. | ............. | 707/101 |

FOREIGN PATENT DOCUMENTS

EP          0 331 329 A1     2/1989

* cited by examiner

*Primary Examiner*—Steven Sax
(74) *Attorney, Agent, or Firm*—Oliff & Berridge, PLC (57) ABSTRACT

A user interface for an image reproducing system that allows the system operator to visit system controls and features in an operator defined order. In this manner, the system operator avoids tabbing or scrolling through unwanted system controls and features. The user interface may utilize an image reproduction operation library that provides visual representations of objects that encapsulate attributes of the imaging system controls and features. The operator may select the visual representations using a pointing device in any desired order to define a preferred image reproduction sequence.

19 Claims, 9 Drawing Sheets

OPERATOR-DEFINED VISITATION SEQUENCE OF CLIENT USER INTERFACE CONTROLS

TECHNICAL FIELD

The present invention generally relates to image reproducing systems and more particularly to user interfaces for selecting an operator defined field visitation sequence in an image forming user interface system.

BACKGROUND OF THE INVENTION

Conventional image reproducing systems allow an operator to set system controls and features, such as, stock type or collating requirements of the imaging job, using a pre-set control and feature visitation sequence that cannot be altered by the operator. As a result, a new imaging job that requires a change to one or more of the image reproducing system settings, requires an operator to tab or scroll through the pre-set visitation sequence of controls and features until reaching the desired controls or features necessary to create the new image reproducing job. In addition, the pre-set visitation sequence also governs the imaging sequence of the imaging job, and hence, each imaging job for the image reproducing system is sequenced in like manner.

Given the wide range of job types and customer preferences in production print environments, the lack of a user interface that provides an operator with the flexibility to visit the controls and features of the image reproducing system in an operator governed sequence, results in a task that consumes unnecessary operator time. This conventional manner of defining an image reproducing job sequence also requires the maximum amount of time to setup and process an imaging job on an image reproducing system. Additionally, since the conventional user interface dictates otherwise, customer requirements often go unmet because an operator cannot sequence the set up of the imaging job in the customer preferred or required order. As such, the conventional user interface of an image reproducing system is cumbersome and hence, an inefficient use of manpower and system resources.

SUMMARY OF THE INVENTION

The present invention addresses the above-described problems of a conventional user interface for an image reproducing system with a set control and feature visitation sequence. In particular, the present invention provides a method and an apparatus that allows an operator of an image reproducing system to define a preferred or required control and feature visitation subset and sequence, which in turn, defines the imaging sequence of the imaging job. Once the operator defines the imaging sequence, the operator may store the sequence for future recall or may designate the sequence as a template for similar imaging jobs. In addition, the operator may select default settings for one or more of the image reproduction operations so that the more common controls or features of the image reproducing system may be preset with desired values.

The above-described approach benefits operators, owners, and lessees of image reproducing systems in that systems are easier to use, and consequently, workplace efficiencies are increased. Because of the added flexibility, there is no longer a need for operators to continually visit unused controls and features of the image reproducing system when selecting an image reproduction sequence. The flexibility of the user interface allows the operator to visit the controls and features of the system in any desired or required order. Additionally, the operator may avoid visiting certain controls and features of the image reproducing system by setting default values for selected controls and features. A further advantage to the operators, owners, and lessees of the image reproducing system is a reduction in imaging reproduction errors and a corresponding increase in customer satisfaction.

In accordance with one aspect of the present invention, an image reproducing apparatus includes a display for viewing and selecting the controls and features of the system. The apparatus may be controlled with a pointing device, such as, a mouse or light pen, or may include a touch screen. The user interface is used by the operator to configure the image processing system in an ordinal sequence defined by the operator. As a result, the operator may submit imaging jobs for imaging in a preferred or required order.

In accordance with another aspect of the present invention, a method is practiced in an image reproducing system using a computer readable medium. The computer readable medium provides computer readable instructions to the image reproducing system to allow an operator to select an image reproducing sequence in an ordinal progression defined by the operator. In this way, the image reproducing system can generate an image reproducing sequence based on the supplied operator input. The computer readable medium also provides the capability to write and read an operator defined image reproducing sequence on a storage medium.

The above described approach provides an owner, operator or lessee of an image reproducing system with the advantage of increasing workflow on an existing image reproducing system with little or no hardware modifications to the system. Image reproduction efficiency improvements may be easily realized by execution of the instructions contained on the computer readable medium.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides a method and an apparatus for optimizing the selection of an image reproduction sequence for an image reproducing system. In the illustrative embodiment, a user interface for receiving operator input allows an operator to generate an image reproducing sequence in a desired order, or in an order required by the imaging job. The operator of the image reproducing system may sequence through the system controls and features, in an operator defined order, to select the required or desired system controls and features. In addition, the operator can store the operator defined imaging sequence on a storage medium for future retrieval. Because the operator defined imaging sequence can be stored on a storage medium, other operators may recall the stored imaging sequence for a future imaging job, or for use as a sequencing template for a similar imaging job.

In the illustrative embodiment, the ability to input an image reproduction sequence in a desired or required order is attractive to operators, owners, and leasees of image reproducing systems. The attractiveness is a result of the image reproducing system becoming easier to use and operate, hence, providing increased work efficiency along with improvements in the quality of, and a reduction in error opportunity for, the imaging job. The implementation of a user interface that allows an operator to define an image reproduction sequence may be obtained with little or no hardware modifications to the existing image reproducing system. This user interface also provides the advantage of allowing the operator to define the work flow sequence using a pointing device, such as a mouse, a light pen, or through the use of a touch screen display.

Figure 1:
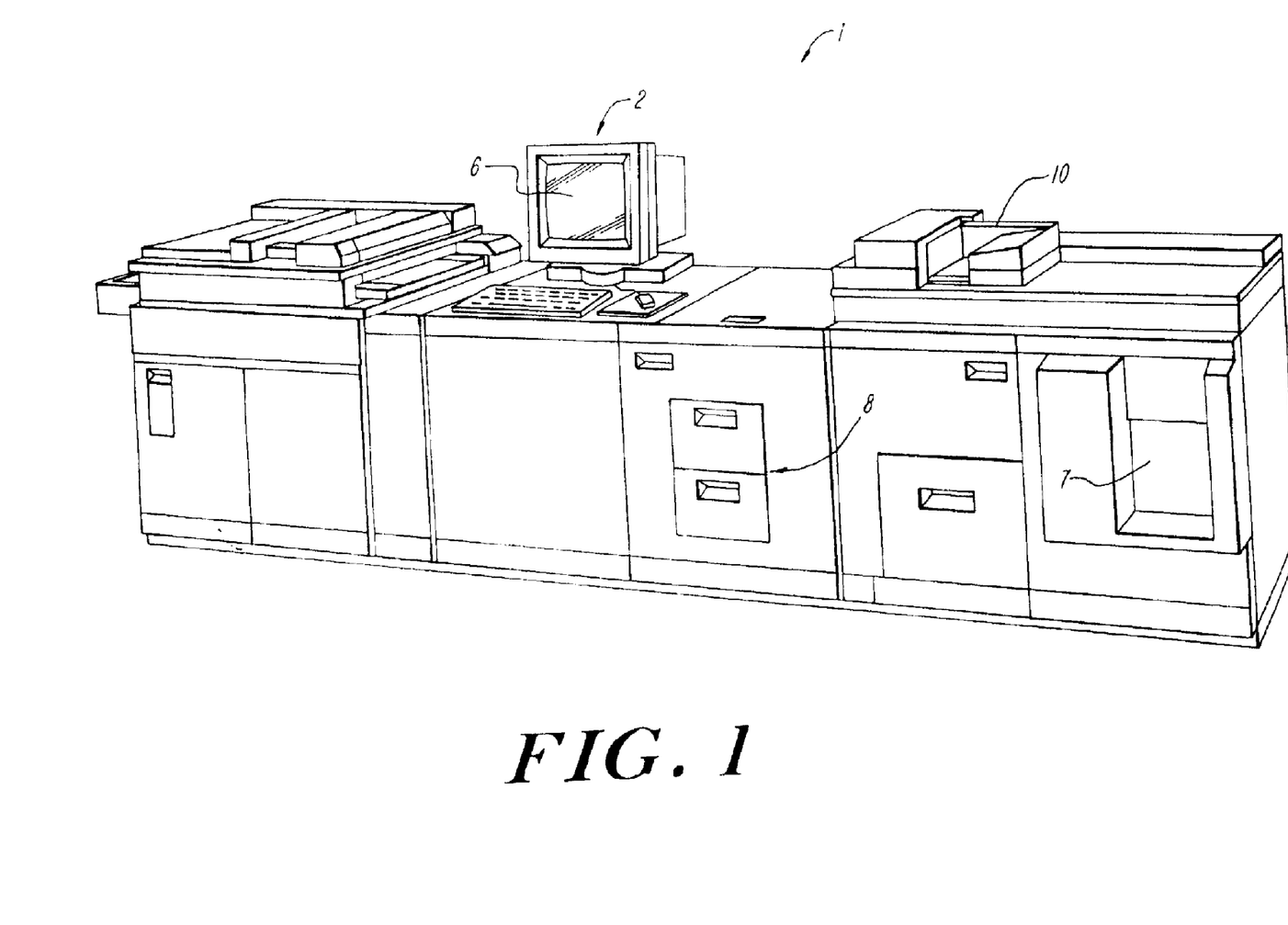
FIG. 1 depicts an image reproduction system suitable for practicing the illustrative embodiment of the present invention.

FIG. 1 illustrates an image reproducing system 1 suitable for use in practicing the present invention. As illustrated, image reproducing system 1 includes a user interface 6, which can be displayed by display terminal 2 for interfacing with a system operator to define the imaging sequence of an imaging job. Operating control over image reproducing system 1 is accomplished through user interface 6. The various controls and functions of image reproducing system 1 are regulated by a processor 11, which may include one or more programmable microprocessors. User interface 6 is in communication with storage device 8 to retrieve and display a previously defined imaging sequence or to store a newly defined imaging sequence. User interface 6 is also in communication with image reproducing device 10 and media tray assembly 7 through processor 11 to select the imaging medium in accordance with the defined imaging sequence. In addition, user interface 6 is able to instruct processor 11 to control and monitor the operation of image reproducing device 10 during all phases of the image forming operation.

Figure 2:
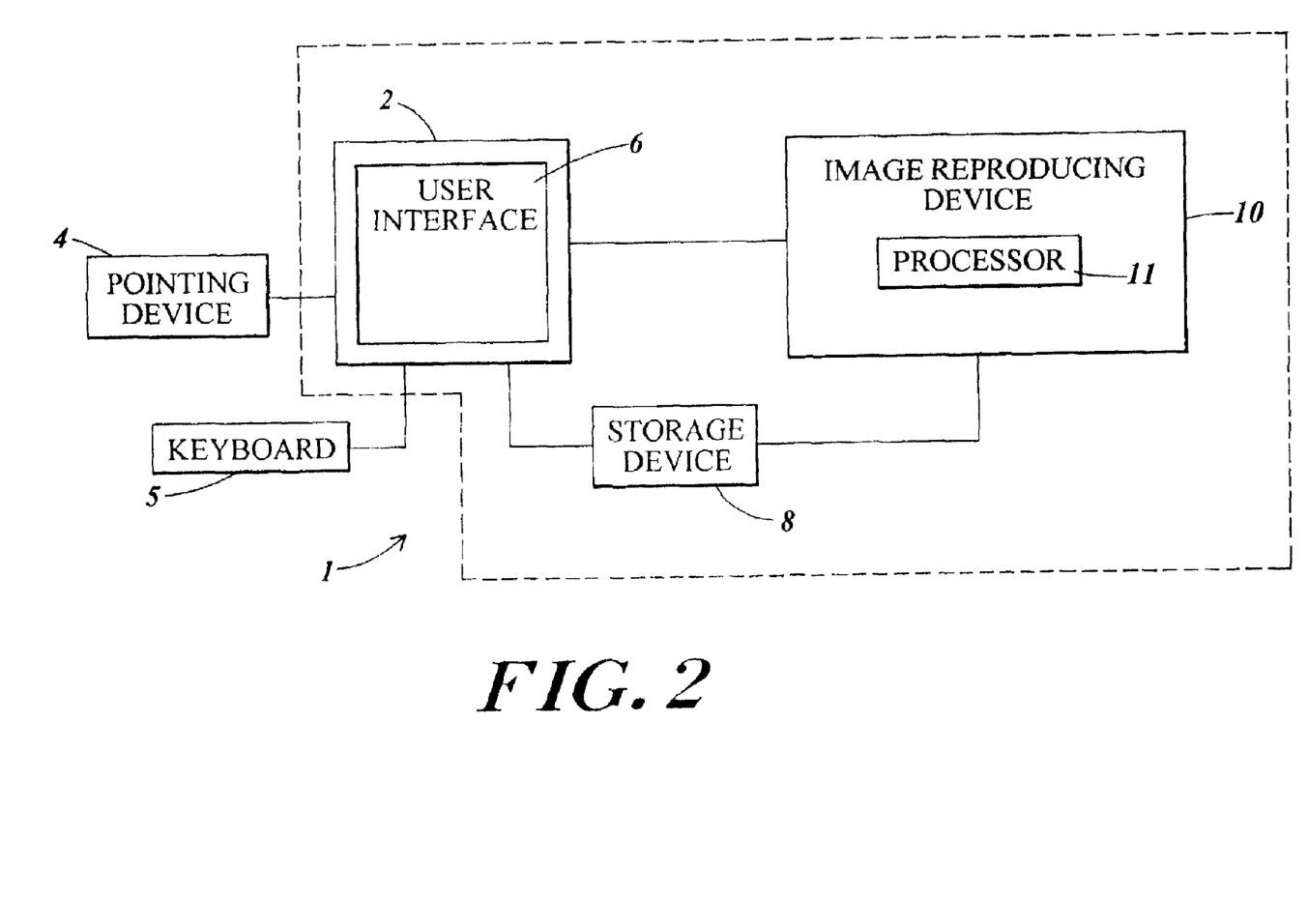
FIG. 2 depicts a block diagram of an image reproduction system suitable for practicing the illustrative embodiment of the present invention.

As depicted by FIG. 2, an exemplary block diagram of image reproducing system 1 illustrates the relationship of the various system components that support an operator defined image reproduction sequence. Image reproducing system 1 may be a single apparatus, as represented by FIG. 1, or alternatively may be discrete components placed in local or remote areas that are interconnected by one or more interconnections that carry the necessary control signals, data signals, timing signals, and the like.

Image reproducing device 10 may be a printer, a photocopier, a scanner, a facsimile machine, or the like. Storage device 8 is used for storing the operator defined image reproducing sequence along with other computer executable instructions and various data files. Storage device 8 may be incorporated directly into the image reproduction system 1, or alternatively may be in remote communication with the image reproduction system 1. The storage device 8, may be a hard disk drive, a floppy disk drive, a zip drive, or another variety of memory device. One skilled in the art will appreciate that storage device 8 may also be an electronic device such as, a RAM device, an E-PROM device, an EE-PROM device or other similar semiconductor device that is capable of performing read/write operations.

Display monitor 2 provides the operator with a visual user interface 6 for sequencing and selecting the desired or required control or feature of the image reproducing system 1. The display monitor 2 may be a CRT, or a flat panel display. User interface 6 may represent on display monitor 2 the controls and features of the image reproducing system 1 as one or more pull down menus, as icons that represent an object that encapsulates attributes of a control or feature, as a property sheet with one or more tabbed property pages, as one or more buttons, as one or more scrollable text boxes, list boxes, or the like. An operator of image reproducing system 1 may use pointing device 4 to select or deselect, at will, the graphical image reproduction controls and features of the image reproducing system 1. Alternatively, an operator may use a touch screen 3, as part of the display monitor 2, for the selection and deselection of desired controls or features in defining an image reproducing sequence. Nevertheless, one skilled in the art will appreciate that some aspects of the present invention may be practiced with a combination of pointing devices and graphical user interface elements that allow an operator to define the ordinal sequence of an image reproducing sequence.

Figure 3:
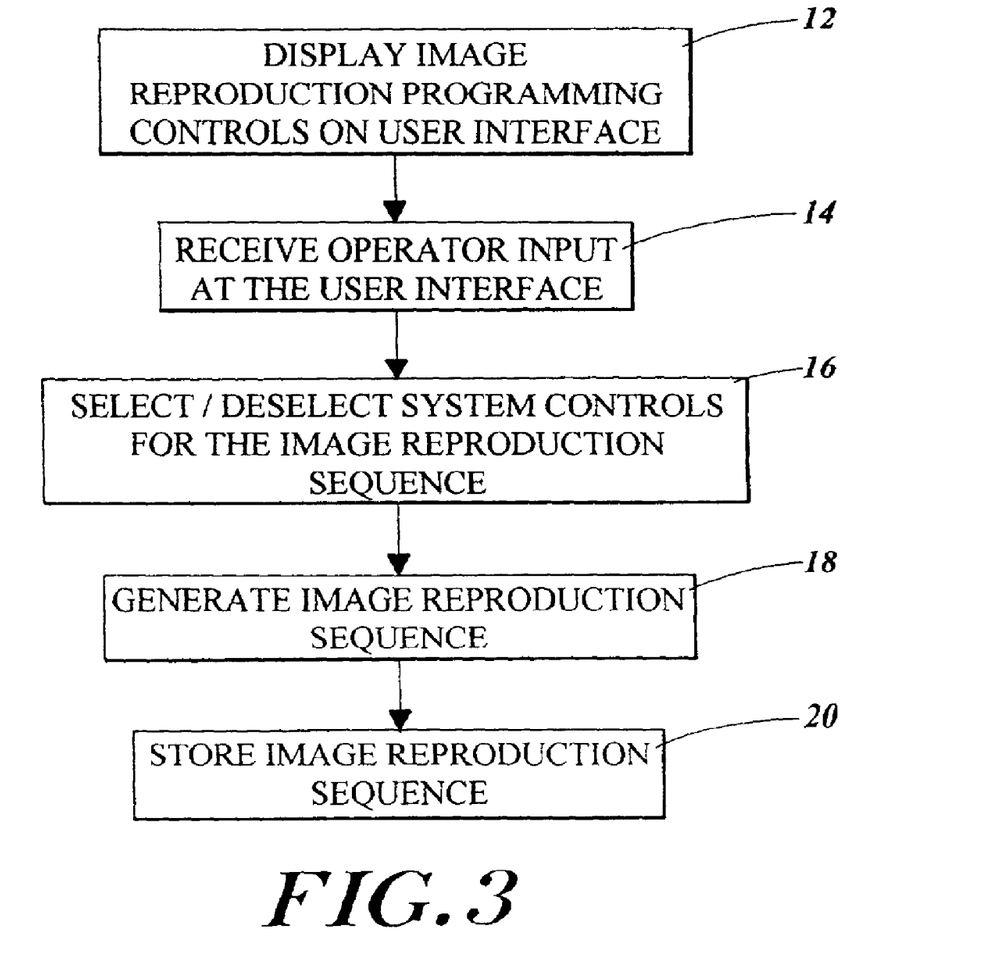
FIG. 3 is a flow chart illustrating the steps that are preformed to set a preferred imaging job sequence.

FIG. 3 is a flow chart illustrating the steps performed to define an image reproducing sequence in an operator defined order. To interface with the operator, display monitor 2 displays the graphical interface elements of user interface 6 that represent the controls and features associated with the image reproducing system 1 (step 12 in FIG. 3). The operator of image reproduction system 1 using pointing device 4, touch screen 3, or key board 5, selects a preferred or desired image reproducing sequence by tabbing or scrolling, in an ordinal manner defined by the operator, through the various controls and features of the system (step 14 in FIG. 3). At each selected control or feature, the operator may select or deselect one or more control or feature settings (step 16 in FIG. 3). At each desired control or feature, the operator may again tab, scroll, or utilize other various graphical user interface elements, such as, pull down menus, list boxes, buttons, text boxes, icons that represent encapsulated objects, or hyper-links, to select the preferred or required setting for the selected control or feature.

When the operator has completed selecting a preferred or required image reproduction sequence, processor 11 of the image reproducing device 10, collects the image reproduction sequence from user interface 6 and instructs image reproduction system 1 in the execution of the selected imaging sequence (step 18 in FIG. 3). If the operator desires to save the operator defined image reproduction sequence, the operator may request processor 11 of image reproducing device 10 to write the image reproduction sequence to storage device 8 (step 20 in FIG. 3).

When the operator selects a user interface element displayed on display terminal 2, a visual change of the selected element occurs, such as, a shadowing or a change in border style. When the pointer or the operator's finger is withdrawn from the graphical user element, the selection will be accepted and the element changes to indicate the selection as described above.

Processor 11 is able to track the operator selection sequence of controls and features, so that at the completion of the operator selection process, processor 11 directs the operation of image reproducing system 1 in a manner that corresponds to the operator selection sequence. In one embodiment of the present invention, the image reproducing system 1 includes one or more dedicated processors programmed to perform various controls and functions, such as image enhancement, thresholding/screening, rotation, resolution conversion and media tray control. When the operator selects the desired control or function using user interface 6, the selection activates a function call that requests the services of the associated dedicated processor. As the function calls are selected, they are stored in a group of image processing control registers, the registers being controlled by processor 11. The function calls are stored in the control registers in First In First Out (FIFO) fashion so that the first selected control or feature is the first function call processor 11 executes to form an image.

If desired, the operator of the image reproducing system 1 may request processor 11 of image reproducing device 10 to invoke an operator access control component or module that restricts access to the stored image reproduction sequence on storage device 8. In this way, an operator can control the access to any customer-sensitive image reproducing jobs, or limit the use of specific features and controls of the image reproducing system 1 to designated operators.

Figure 4:
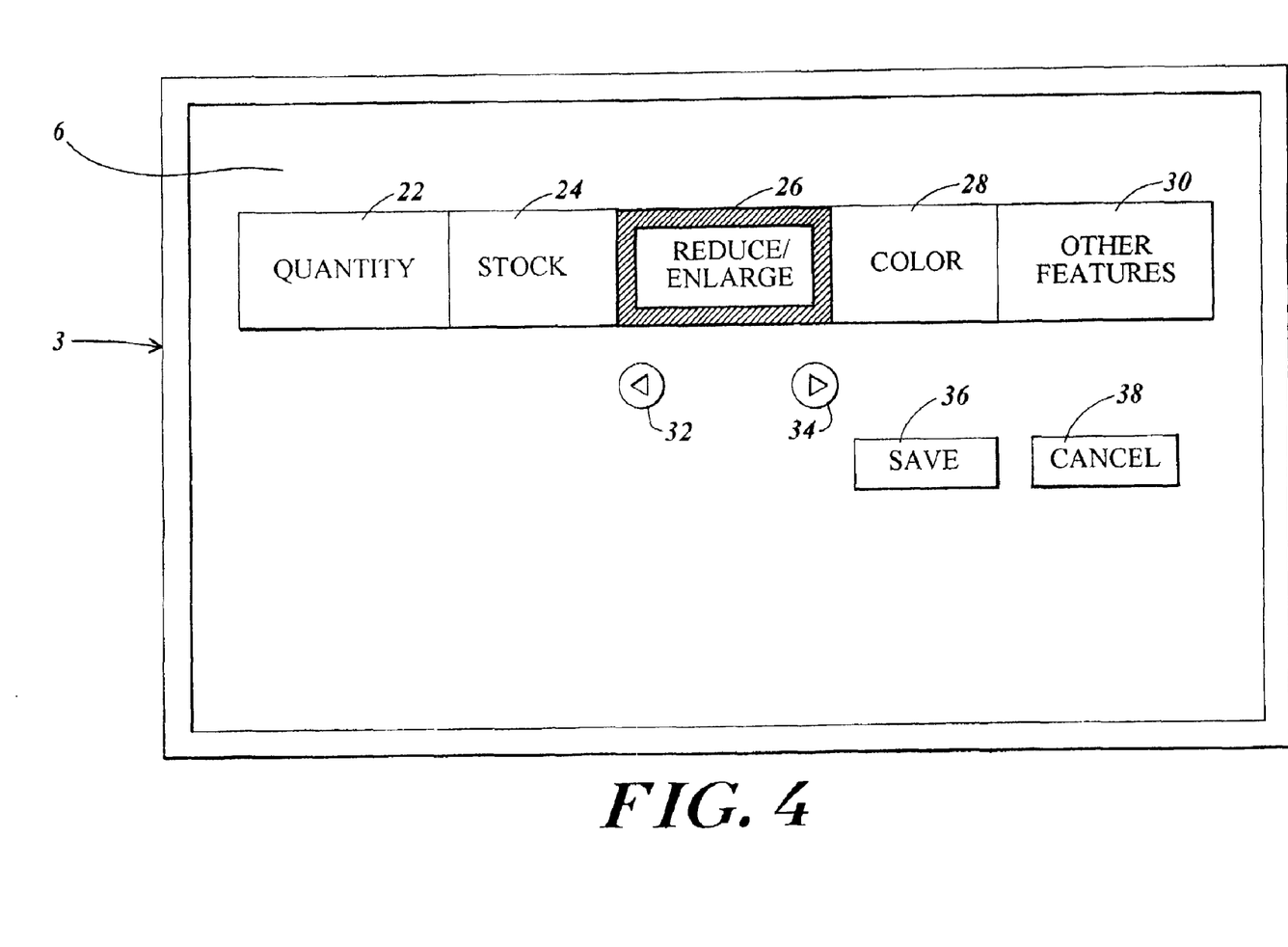
FIG. 4 illustrates an exemplary user interface with a touch-screen that allows a operator to select image reproducing features and controls in an operator defined manner.

FIG. 4 illustrates an exemplary user interface 6. The operator of image reproducing system 1 may tab forward or tab backwards through the various image reproduction controls and features in an ordinal progression defined by the operator. In this manner, the operator is able to select a preferred or a required image reproducing sequence. One skilled in the art will appreciate that the exemplary operator interface in FIG. 4 may contain additional controls and features that may be specific to the operator's image reproduction system.

The operator may use the tab forward button 34 or the tab backward button 32 to select a desired or required control or feature menu. One manner to indicate the selected control or feature is to differentiate the selected control or feature menu using a shaded or stylized border. User interface 6 may display the control or feature menus sequentially as depicted in FIG. 4, or user interface 6 may display the control or feature menus as independent stand-alone menus that are displayed one at a time. Examples of control and feature menus that an operator may access to define an image reproduction sequence include an image quantity menu 22, a reduction/enlargement menu 26, an image color menu 28, and, an other features menu 30. In addition, user interface 6 provides the operator with save button 36, so that the operator may save the preferred or required image reproduction sequence to storage device 8, or alternatively, the operator may select cancel button 38 to cancel or deselect the just selected image reproduction controls and features.

Figure 5:
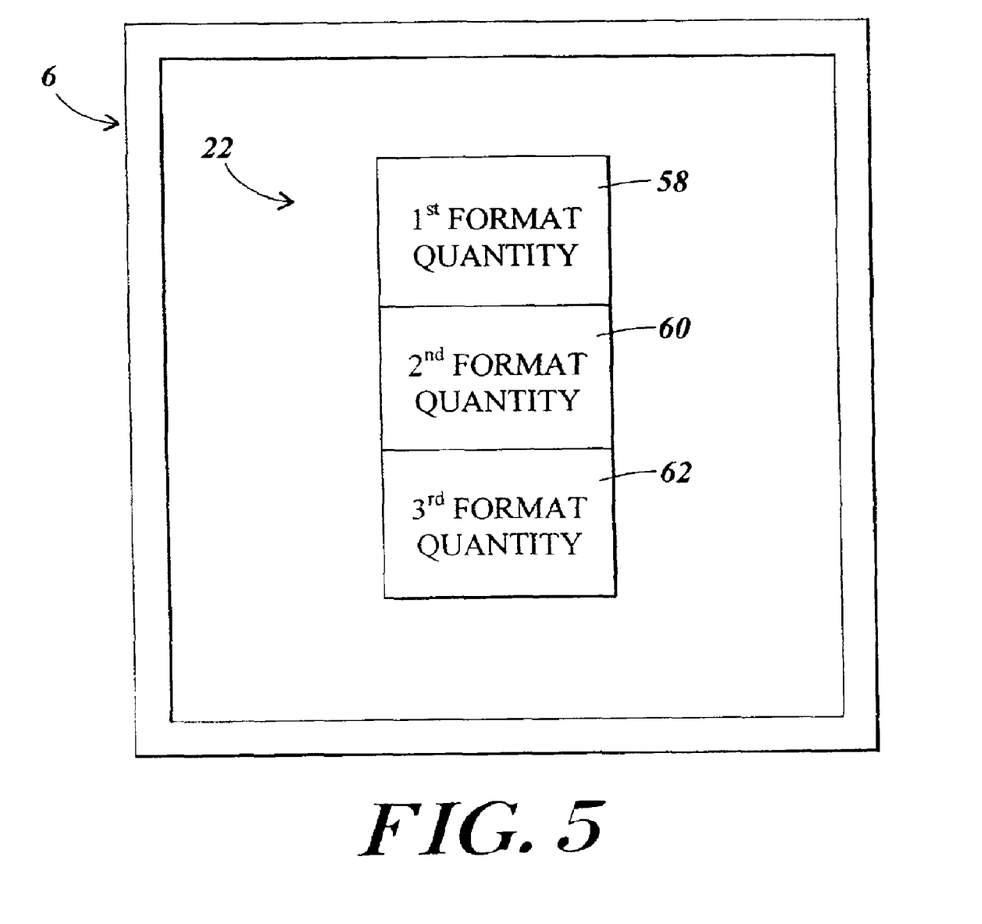
FIG. 5 illustrates an exemplary image reproduction system control menu.

FIG. 5 illustrates options available in quantity menu 22. From quantity menu 22, the operator-may enter an imaging quantity for a first format in text box 58, an imaging quantity for a second image format in text box 60, and an imaging quantity for a third image format in text box 62. One skilled in the art will appreciate that additional imaging format quantity text boxes may be added to match the required number of imaging formats required for the image reproduction job. In addition, the text boxes of FIG. 5 may also be list boxes, or other graphical user interface elements such as, a series of check boxes that have a numeric character in close proximity that indicate an imaging format quantity.

Figure 6:
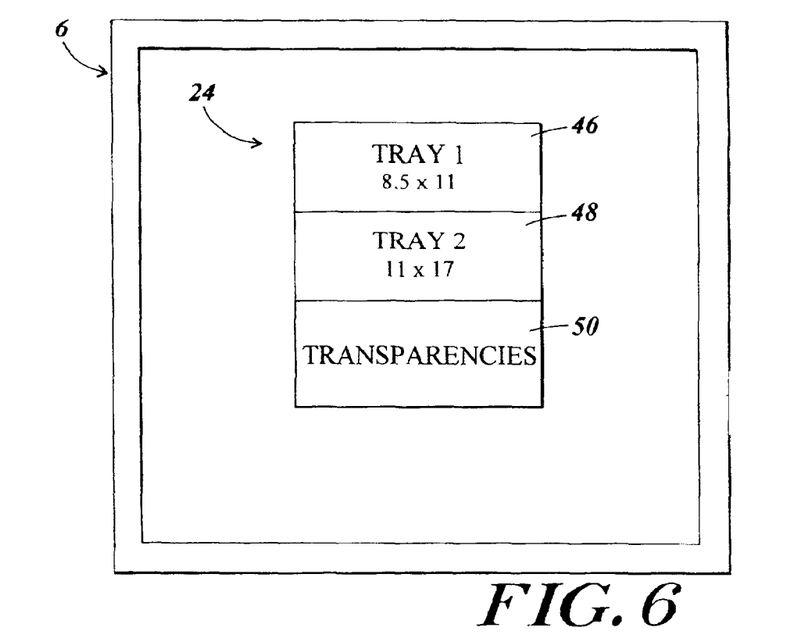
FIG. 6 illustrates an exemplary image reproduction system control menu.

From stock menu 24, illustrated in FIG. 6, an operator may select button 46, or other graphical user interface element, that represents the 8.5×11 imaging medium tray of the image reproducing system. Similarly, the operator may select the button 48 that represents the 11×17 imaging medium tray, or the button 50 that represents the transparencies imaging medium tray.

One skilled in the art will appreciate that graphical user interface elements 46, 48, and 50, may also be visual icons that represent encapsulated objects for the desired image reproduction system control or feature. Selection of an icon by an operator using pointing device 4, keyboard 5, or touch screen 3, provides processor 11 with the necessary attributes and methods for inclusion of the selected control or feature in the image reproduction sequence.

Figure 7:
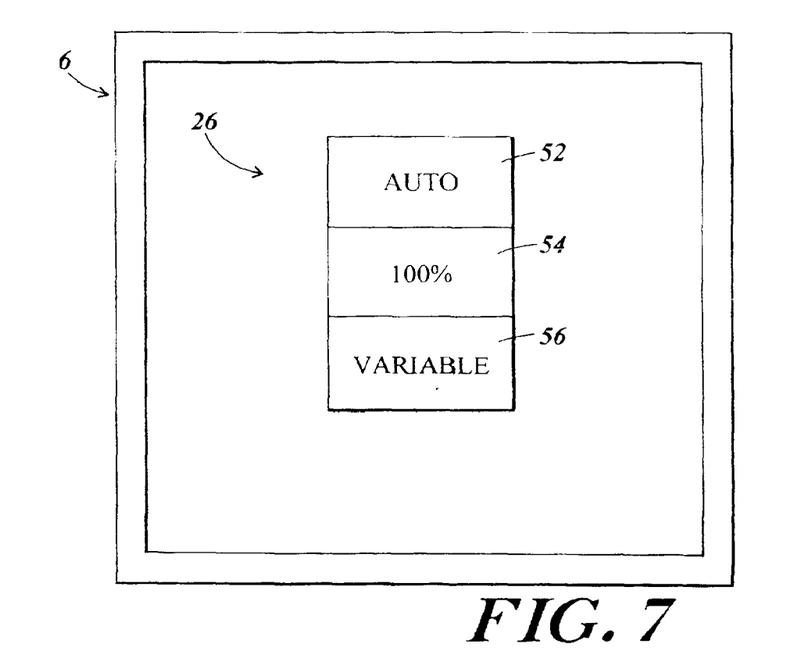
FIG. 7 illustrates an exemplary image reproduction system control menu.

As depicted by FIG. 7, imaging system controls and features available under reduction/enlargement menu 26 may include an auto reduction/enlargement button 52, a percent reduction/enlargement button 54, and a variable reduction/enlargement button 56. As discussed above, system control buttons 52, 54, and 56 may be selected from other graphical user interface elements. In addition, one skilled in the art will recognize that the selection of a graphical user interface element may trigger the initiation of additional user interface menus or graphical user interfaces.

Figure 8:
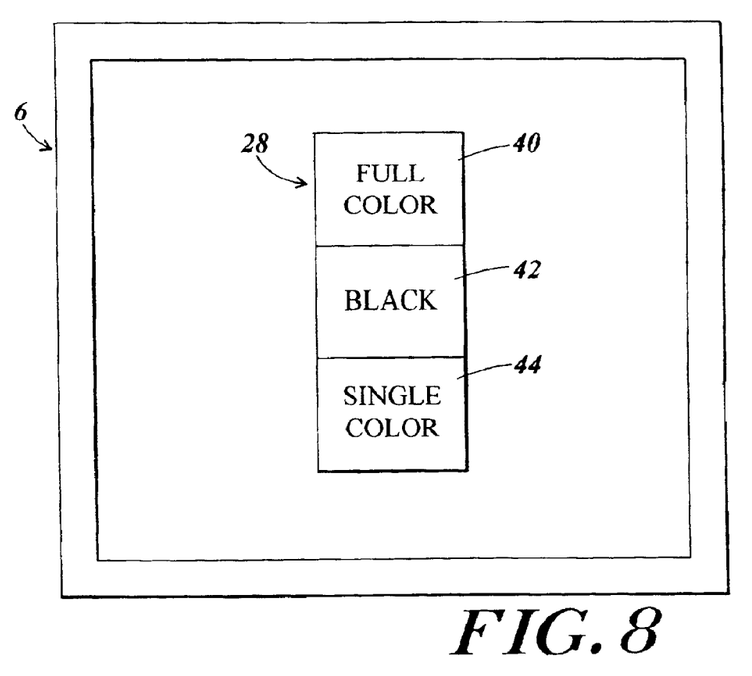
FIG. 8 illustrates an exemplary image reproduction system control menu.

In like manner, the selection of color menu 28 using pointing device 4, keypad 5, or touch screen 3, provides the operator with the associated color controls and features of the imaging reproduction system 1, as shown in FIG. 8. From color menu 28, an operator may select full color button 40, black and white button 42, or single color button 44. One skilled in the art will recognize that the operator's selection of a graphical user interface element may initiate the display of an additional controls and features menu, or provide a prompt to the operator for additional input or instructions.

Figure 9:
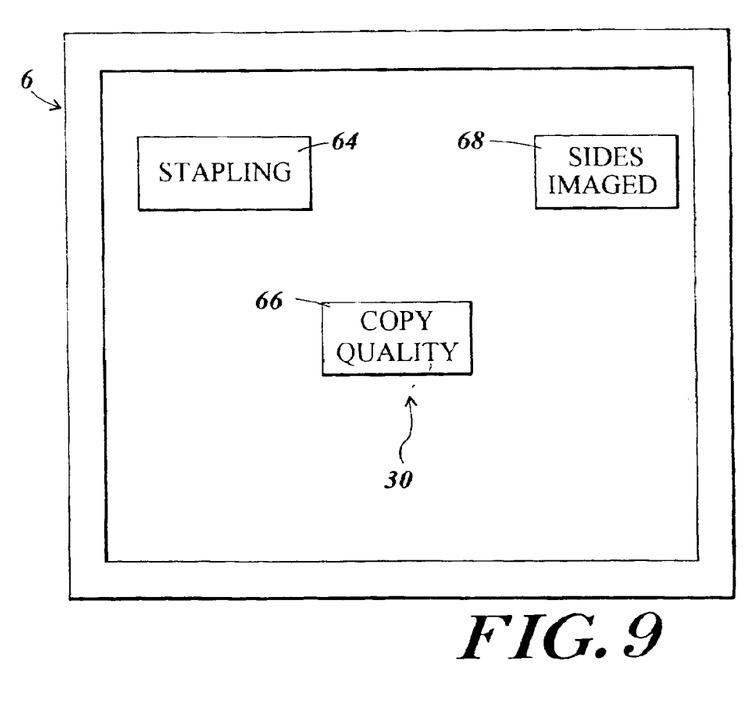
FIG. 9 illustrates an exemplary image reproduction system control menu.

Selection of other features menu 30, exemplified in FIG. 9 invokes various imaging system controls and features such as, a stapling button 64, double sided imaging button 68, or a copy quality button 66. One skilled in the art will appreciate that depending on the type of image reproducing system being utilized, additional system controls and features may be made available to the operator in the form of additional buttons or menu items.

Figure 10:
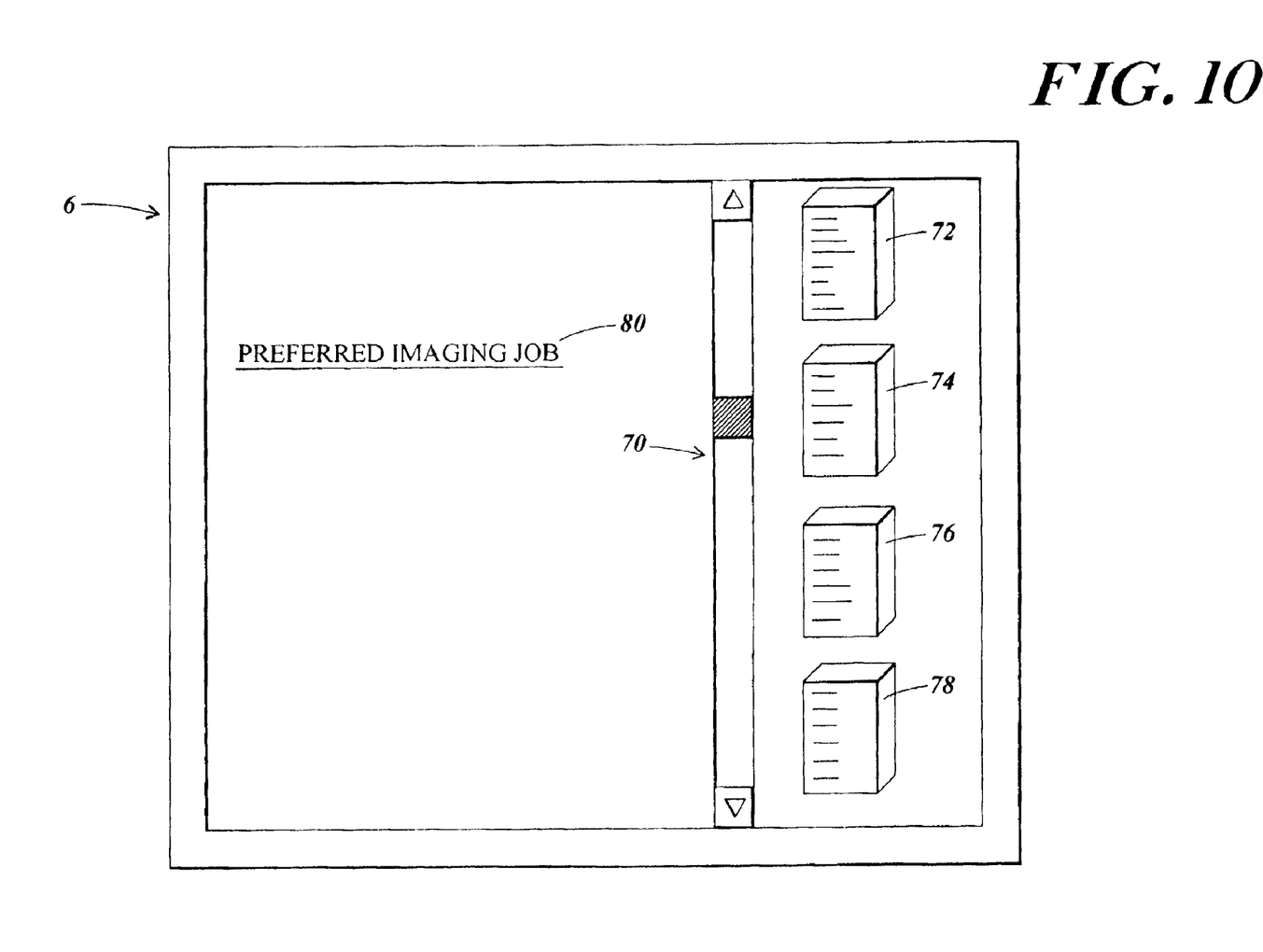
FIG. 10 depicts an illustrative image reproduction operation library wherein icons and hyper-links for image reproducing operations are displayed.

User interface 6 may be utilized to display a control library as shown in FIG. 10. In this manner, the various controls and features of the image reproducing system 1 maybe selected from various icons that represent the controls and features of image reproducing system 1. The icons are visual representations of objects that encapsulate attributes of an image reproducing system control or feature, such as, stock color, stock size, stock weight, image quality, double-sided imaging, or the like.

An operator utilizing pointing device 4, keyboard 5, or touch screen 3 may use scroll bar 70 to scroll through the icons on display to select and choose the operator defined image reproduction sequence. The operator may select one or more of these icons, such as, icon 72 to select an imaging medium, or icon 74 to select double sided imaging, or icon 76 to select collating, or icon 78 to select stapling, by highlighting or clicking on the desired icon with pointing device 4. One skilled in the art will recognize that the icons represented in FIG. 10 are illustrative and not limiting of image reproducing system controls and features.

The graphical user interface 6 may also be a split window that allows the display of additional imaging system control icons with an additional scroll bar. In addition, the user interface 6 may also display one or more stored image reproduction sequences as a link 80. Link 80 allows the operator to use pointing device 4 to select a pre-existing image reproduction sequence that is stored on storage device 8. Selection of link 80 initiates the execution of a piece of software that gives processor 11 the necessary instructions to locate the stored image reproduction sequence on storage device 8 and to program the image reproduction system 1 in accordance with the controls and features selected therein.

Figure 11:
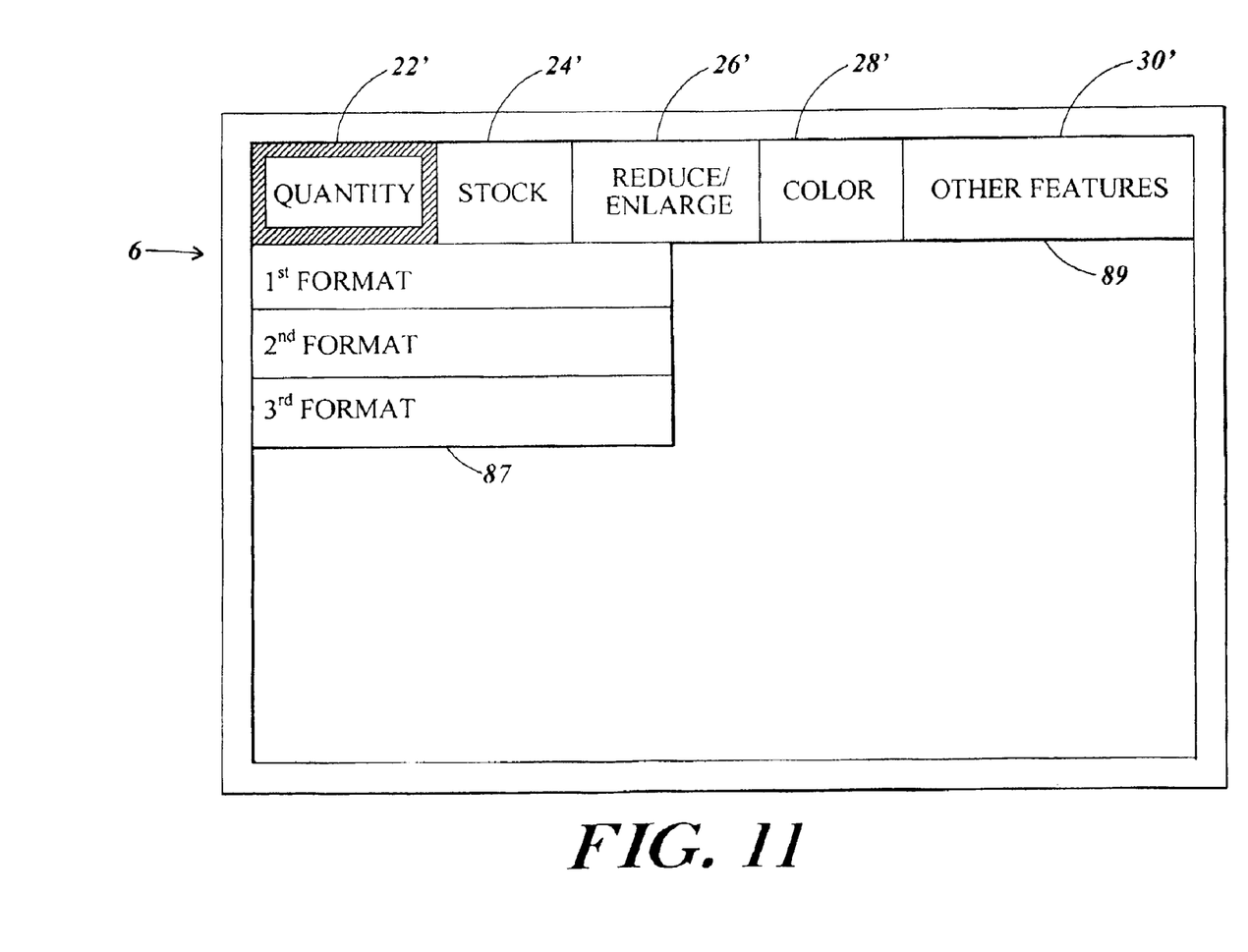
FIG. 11 depicts an illustrative user interface that provides pull down menus for accessing controls and features of the image reproducing system.

User interface 6 may be configured to provide a menu bar 89 as illustrated in FIG. 11. Menu bar 89 is adapted to display available menus such as, imaging quantity 22', stock type menu 24', reduction/enlargement menu 26', color selection menu 28', and other image reproduction features menu 30'. An operator selecting the name of an available menu using pointing device 4, keyboard 5, or touch screen 3, causes a list of menu options in the selected menu to be displayed. For example, image reproduction format menu 22' has been selected by the operator and the available menu options are displayed by the drop down menu 87.

As shown in FIG. 11, drop down menu 87 allows the operator of image reproducing system 1 to select an imaging quantity for a first imaging format, an imaging quantity for a second imaging format, and an imaging quantity for a third imaging format. The menus shown in menu bar 89 are representative of the menus discussed above in more detail. Nevertheless, one skilled in the art will appreciate that additional menus may be added to menu bar 89 to support the various controls and features of an image reproducing system 1.

Those skilled in the art will appreciate that the depictions of user interface 6 are not limited solely to the examples described above. For example, a user interface may be a property sheet with tabbed property pages which contain one or more graphical user interface elements for selecting controls and features of the image reproducing system 1.

While the present invention has been described with reference to an illustrative embodiment thereof, those skilled in the art will appreciate that various changes in form and detail may be made without departing from the intended scope of the present invention as defined in the appended claims.

What is claimed is:

1. In an image reproducing apparatus having a user interface, a method comprising the steps of:
presenting a plurality of graphical user interface elements on a display for viewing by an operator, wherein said graphical user interface elements represent parameter setting menus for operational features of said image reproducing apparatus;
receiving a selection of one or more of said graphical user interface elements at the user interface in a chronological sequence defined by the operator for a selected imaging job;
displaying the parameter setting menus represented by the selected graphical user interface elements in an order defined by the operator wherein the order of the displayed parameter setting menus is interchangeable and controlled by the operator, the parameter setting menus being contextually independent of each other; and
storing the ordered sequence defined by the operator on a storage medium.

2. The method of claim 1 further comprising the step of, selecting default values for one or more image reproduction operations of the image reproducing apparatus.

3. The method of claim 1, wherein the selected parameter setting menus are used for setting parameters for a print job.

4. The method of claim 1, wherein the selected parameter setting menus are used for setting parameters for a copy job.

5. The method of claim 1, wherein the graphical user interface elements presented on the display include icons that are visual representations of objects that encapsulate attributes of a function of the image reproducing apparatus.

6. The method of claim 2 further comprising the step of, deselecting one or more of the default values for one or more image reproduction operations of the image reproducing apparatus.

7. In an image reproducing system utilizing a computer controlled user interface for selecting a sequence of parameter setting menus that enable setting of parameters for image reproduction, a computer-readable medium holding computer-executable instructions for performing a method of selecting a sequence of parameter setting menus that enable setting of parameters for image reproduction comprising the steps of:
receiving operator input at the user interface in a sequence defined by an operator to program the image reproducing system to display selected parameter setting menus in an order defined by said operator wherein the order of the displayed parameter setting menus is interchangeable and controlled by the operator, the parameter setting menus being contextually independent of each other;
generating a sequence of parameter setting menus that enable setting of parameters for image reproduction based on the received operator input; and
storing the ordered sequence of parameter setting menus that enable setting of parameters for image reproduction on a storage medium.

8. The computer readable-medium of claim 7 further comprising the step of, selecting default values for one or more image reproduction operations of the image reproducing system.

9. The computer readable-medium of claim 7, wherein the selected parameter setting menus are used for setting parameters for a print job.

10. The computer readable-medium of claim 7, wherein the selected parameter setting menus are used for setting parameters for a copy job.

11. The computer readable-medium of claim 7 further comprising the step of, presenting one or more graphical user interface elements at the user interface for selecting the operator defined sequence.

12. The computer readable-medium of claim 8 further comprising the step of, deselecting one or more of the default values for one or more image reproduction operations of the image reproducing apparatus.

13. A computer controlled user interface for programming an image reproduction sequence of an image reproducing system comprising:
a display for viewing by an operator wherein the display displays a plurality of visual representations of parameter setting menus that enable setting of parameters for image reproduction, the parameter setting menus being contextually independent of each other;
an input device for use by the operator for selecting the plurality of visual representations representing parameter setting menus that enable setting of parameters for image reproduction in a sequential manner defined by the operator; and
a processor for configuring the image reproducing system to display the parameter setting menus that enable setting of parameters for image reproduction in an order defined by the operator, the parameter setting menus being represented by the selected visual representations, in the ordered manner defined by the operator using the input device wherein the order of the displayed parameter setting menus is interchangeable and controlled by the operator and further comprising a storage device for storing the ordered sequence of parameter setting menus defined by the operator.

14. The computer controlled user interface of claim 13 further comprising an image reproduction function library that provides visual representations of parameter setting menus.

15. The computer controlled user interface of claim 13, wherein the plurality of visual representations of parameter setting menus that enable setting of parameters for image reproduction is a plurality of visual representations of objects that encapsulate attributes of image reproducing functions.

16. The computer controlled user interface of claim 13, wherein the plurality of visual representations of parameter setting menus that enable setting of parameters for image reproduction is a plurality of icons.

17. The computer controlled user interface of claim 13, wherein the interface displays at least one selectable element linked to one or more stored image reproducing sequences.

18. The computer controlled user interface of claim 13, wherein the plurality of visual representations of a sequence of parameter setting menus that enable setting of parameters for image reproduction is a plurality of windows.

19. The computer controlled user interface of claim 13, wherein the input device includes a touch screen.

* * * * *